United States Patent
Kilian et al.

(10) Patent No.: US 11,089,472 B2
(45) Date of Patent: Aug. 10, 2021

(54) TRANSMITTER FOR EMITTING SIGNALS AND RECEIVER FOR RECEIVING SIGNALS

(71) Applicant: Fraunhofer-Gesellschaft zur Förderung der angewandten Forschung e.V., Munich (DE)

(72) Inventors: Gerd Kilian, Erlangen (DE); Josef Bernhard, Nabburg (DE); Jakob Kneißl, Fürth (DE); Johannes Wechsler, Spalt (DE); Dominik Soller, Schwaig (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 16/543,772

(22) Filed: Aug. 19, 2019

(65) Prior Publication Data

US 2019/0373460 A1    Dec. 5, 2019

Related U.S. Application Data

(63) Continuation of application No. PCT/EP2018/056210, filed on Mar. 13, 2018.

(30) Foreign Application Priority Data

Mar. 14, 2017    (DE) .......................... 102017204181.1

(51) Int. Cl.
*H04W 12/033* (2021.01)
*H04L 5/00* (2006.01)
(Continued)

(52) U.S. Cl.
CPC ......... *H04W 12/033* (2021.01); *H04L 5/0044* (2013.01); *H04L 61/2069* (2013.01);
(Continued)

(58) Field of Classification Search
CPC ......... H04W 12/0013; H04W 12/1006; H04W 12/00512; H04W 12/04033; H04W 84/18;
(Continued)

(56) References Cited

U.S. PATENT DOCUMENTS 4,509,093 A * 4/1985 Stellberger .............. B60R 25/24
340/10.41
5,508,692 A * 4/1996 Wolfram ............ G07C 9/00182
235/382.5
(Continued)

FOREIGN PATENT DOCUMENTS

CN    101795301 A    8/2010
CN    102891800 A    1/2013
(Continued)

OTHER PUBLICATIONS

Russian Office Action dated May 20, 2020, issued in application No. 2019132206.
(Continued)

*Primary Examiner* — Badri Champakesan Badrinarayanan
(74) *Attorney, Agent, or Firm* — McClure, Qualey & Rodack, LLP

(57) ABSTRACT

The invention refers to a transmitter for emitting at least one signal towards a receiver. A signal generator generates the signal such that the signal includes data content. The data content is modified using an identifier assigned to the transmitter or assigned to the receiver. The invention also refers to a receiver and corresponding methods.

31 Claims, 4 Drawing Sheets

(51) Int. Cl.
  *H04L 29/12* (2006.01)
  *H04W 12/71* (2021.01)
  *H04W 12/106* (2021.01)
  *H04W 12/0433* (2021.01)
(52) U.S. Cl.
  CPC ..... *H04W 12/0433* (2021.01); *H04W 12/106* (2021.01); *H04W 12/71* (2021.01); *H04L 61/6072* (2013.01)
(58) Field of Classification Search
  CPC .... H04W 8/26; H04L 5/0044; H04L 61/2069; H04L 61/6072; H04L 45/74
  USPC ........................................................ 380/270
  See application file for complete search history.

(56) References Cited

U.S. PATENT DOCUMENTS

| | | | | |
|---|---|---|---|---|
| 5,525,976 A * | 6/1996 | Balgard | ................ | G01K 1/024 340/870.17 |
| 6,437,692 B1 * | 8/2002 | Petite | .................... | G01D 4/004 340/540 |
| 6,792,615 B1 * | 9/2004 | Rowe | .................. | H04H 20/103 725/37 |
| 8,804,735 B2 * | 8/2014 | An | ........................ | H04L 45/124 370/392 |
| 9,851,982 B2 * | 12/2017 | Hall | ...................... | G06F 9/4416 |
| 2002/0034257 A1 * | 3/2002 | Bergerhoff | .............. | H04K 1/00 375/259 |
| 2003/0147371 A1 * | 8/2003 | Choi | .................... | H04B 7/2637 370/341 |
| 2004/0128391 A1 * | 7/2004 | Patzer | .................... | H04L 12/66 709/228 |
| 2005/0062998 A1 * | 3/2005 | Kumashio | ............ | G06F 21/608 358/1.14 |
| 2005/0108757 A1 * | 5/2005 | Lee | .................. | H04N 21/23617 725/50 |
| 2005/0199716 A1 * | 9/2005 | Shafer | ............... | H04L 29/12783 235/385 |
| 2007/0047642 A1 * | 3/2007 | Erlandson | .............. | H04N 19/61 375/240.01 |
| 2009/0054033 A1 * | 2/2009 | Pratt, Jr. | ........... | H04W 56/0015 455/410 |
| 2009/0190521 A1 * | 7/2009 | Horn | ................... | H04W 40/248 370/315 |
| 2009/0210709 A1 * | 8/2009 | Fujiwara | ............... | H04L 9/0838 713/171 |
| 2011/0053619 A1 * | 3/2011 | Shaheen | ................. | H04W 8/26 455/466 |
| 2011/0194537 A1 * | 8/2011 | Proctor, Jr. | ........... | H04L 1/0083 370/335 |
| 2012/0010879 A1 * | 1/2012 | Tsujino | .................... | G10L 19/03 704/203 |
| 2012/0308012 A1 * | 12/2012 | Yoon | ..................... | H04L 9/0847 380/282 |
| 2014/0176341 A1 * | 6/2014 | Bernhard | .............. | H04W 72/04 340/870.02 |
| 2015/0139030 A1 * | 5/2015 | Nomura | .................. | H04L 45/02 370/254 |
| 2015/0348561 A1 * | 12/2015 | Kovesi | ..................... | H04B 3/21 704/226 |
| 2016/0013891 A1 * | 1/2016 | Ji | .......................... | H04L 1/1864 370/389 |
| 2016/0065362 A1 * | 3/2016 | Choyi | ................... | H04L 9/0847 380/279 |
| 2016/0359803 A1 * | 12/2016 | Kwon | .................... | H04L 45/745 |
| 2017/0117000 A1 * | 4/2017 | Kikuiri | ................ | G10L 19/0204 |
| 2017/0162208 A1 * | 6/2017 | Soulodre | ................ | G10L 19/167 |
| 2017/0164136 A1 * | 6/2017 | Saur | ........................ | H04W 4/70 |
| 2018/0035153 A1 * | 2/2018 | Yang | .................. | H04N 21/4104 |
| 2018/0146073 A1 * | 5/2018 | Kameyama | .............. | H04L 29/08 |

FOREIGN PATENT DOCUMENTS

| | | | |
|---|---|---|---|
| CN | 103973832 | A | 8/2014 |
| CN | 105981318 | A | 9/2016 |
| CN | 106465416 | A | 2/2017 |
| DE | 692 12 594 | T2 | 3/1997 |
| DE | 100 16 133 | A1 | 10/2001 |
| DE | 600 33 178 | T2 | 11/2007 |
| DE | 10 2011 082 098 | A1 | 3/2013 |
| EP | 1 168 670 | A2 | 1/2002 |
| EP | 2400694 | A2 | 12/2011 |
| EP | 2 645 709 | A2 | 10/2013 |
| EP | 2 958 259 | A1 | 12/2015 |
| EP | 3 070 949 | A1 | 9/2016 |
| JP | H11252065 | A | 9/1999 |
| JP | 2003087329 | A | 3/2003 |
| JP | 2004140808 | A | 5/2004 |
| JP | 2005026825 | A | 1/2005 |
| JP | 2005099948 | A | 4/2005 |
| JP | 2010016465 | A | 1/2010 |
| JP | 2010239232 | A | 10/2010 |
| JP | 2011199515 | A | 10/2011 |
| JP | 2012249293 | A | 12/2012 |
| JP | 2011034046 | A | 9/2013 |
| JP | 2015050708 | A | 3/2015 |
| JP | 2016506543 | A | 10/2015 |
| JP | 2015184470 | A | 1/2016 |
| JP | 2016502139 | A | 3/2016 |
| RU | 2476017 | C2 | 2/2013 |
| WO | 2013136846 | A | 2/2011 |
| WO | 2014153769 | A1 | 10/2014 |
| WO | 2015130752 | A1 | 9/2015 |

OTHER PUBLICATIONS

English Translation of Russian Office Action dated May 20, 2020, issued in application No. 2019132206.
International Search Report dated Jun. 21, 2018, issued in application No. PCT/EP2018/056210.
Office Action in the parallel Japanese patent application No. 2019-553970, dated Dec. 10, 2020, with English Translation.
Office Action in the parallel Japanese patent application No. 2019-553965, dated Dec. 10, 2020, with English Translation.
Office Action in the parallel Japanese patent application No. 2019-550847, dated Jan. 5, 2021, with English Translation.
Chinese Office Action, dated Feb. 23, 2021, in parallel patent application No. 2018800184764.
Korean language office action dated May 20, 2021, issued in application No. KR 10-2019-7026603.
English language translation of Korean office action dated May 20, 2021, issued in application No. KR 10-2019-7026603.

* cited by examiner

TRANSMITTER FOR EMITTING SIGNALS AND RECEIVER FOR RECEIVING SIGNALS

CROSS-REFERENCE TO RELATED APPLICATIONS

This application is a continuation of copending International Application No. PCT/EP2018/056210, filed Mar. 13, 2018, which is incorporated herein by reference in its entirety, and additionally claims priority from German Application No. 102017204181.1, filed Mar. 14, 2017, which is also incorporated herein by reference in its entirety.

The invention relates to a transmitter for emitting at least one signal towards a receiver and to a corresponding method. Further, the invention relates to a receiver for receiving at least one signal emitted by a transmitter and to a corresponding method. The invention also refers to a system comprising at least one transmitter and at least one receiver.

BACKGROUND OF THE INVENTION

Packets transmitted in networks with multiple devices or communication end points (referenced in the following as clients) need to carry information about the destination and/or the origin of the packet to allow associating payload data with the according client or group of clients. For network setups with limited data rates and small transmissions the addressing information can contribute significantly to the total transmission effort. This is especially true when supporting a large number of clients and/or clients need to use globally unique addresses. For example the EUI64 (64-Bit Extended Unique Identifier) standard uses eight bytes to form unique identifiers.

Reducing the amount of data needed for explicit addressing allows transmitting more payload data or decreasing the overall transmission size. This improves the network capacity and/or power consumption of clients.

SUMMARY

According to an embodiment a transmitter for emitting at least one signal towards a receiver may have a signal generator, wherein the signal generator is configured to generate the signal to be emitted by the transmitter, wherein the signal generator is configured to generate the signal such that the signal includes data content, and wherein the signal generator is configured to generate the signal by modifying the data content using an identifier assigned to the transmitter or assigned to the receiver.

According to another embodiment, a method for emitting at least one signal by a transmitter towards a receiver may have the steps of: providing data content, modifying the data content using an identifier assigned to the transmitter or assigned to the receiver, emitting the signal including the modified data content.

According to another embodiment, a receiver for receiving at least one signal emitted by a transmitter may have: a data storage, a de-modifier and an evaluator, wherein the data storage is configured to store identifiers and address information data assigned to the identifiers, where the address information data refers to addresses assigned to transmitters and/or assigned to receivers, wherein the de-modifier is configured to de-modify at least a part of transferred data included by the received signal using identifiers provided by the data storage, and wherein the evaluator is configured to verify whether a de-modification is valid.

According to another embodiment, a method for receiving at least one signal emitted by a transmitter may have the steps of: de-modifying transferred data included by the received signal using identifiers, and verifying whether a de-modification of the transferred data is valid.

According to another embodiment, a system may have at least one inventive transmitter and at least one inventive receiver.

In the following, some aspects are discussed based on embodiments of the transmitter or of the receiver. It is clear, that the corresponding aspects and features are also valid with respect to the receiver or the transmitter, respectively.

The transmitter comprises a signal generator. The signal generator is configured to generate the signal to be emitted by the transmitter and received by a receiver. The signal generator is configured to generate the signal such that the signal comprises data content. The signal generator is configured to generate the signal by modifying the data content using an identifier assigned to the transmitter or assigned to the receiver. The receiver is here the intended receiver as the designated receiver for which the signal is emitted.

According to an embodiment, the signal generator is configured to generate the signal such that the signal is free of an address assigned to the transmitter or to the receiver in its entirety. The address of the transmitter and/or the address of the receiver is here not emitted in its entirety. In order to obtain, nevertheless, the respective address (for the transmitter or the receiver) or the respective addresses (for the transmitter and the receiver), the identifier is used. In one embodiment, there is additionally at least one short-address associated with the respective address as an indicator and/or as a part of the entire address.

In a further embodiment, the transmitter belongs to a transmitter group and/or the receiver belongs to a receiver group. In this case, the identifier is assigned to the respective group. This implies that the identifier is either assigned to the transmitter group—thus identifying the transmitter as a member of the transmitter group—or is assigned to the receiver group. Therefore, the identifier is assigned to the transmitter via the fact that the transmitter belongs to the transmitter group. Additionally or alternatively, the receiver is associated with the identifier by belonging to the receiver group.

In this embodiment, thus, the discussed principle is applied to groups of clients being associated with a specific identifier. The resolved full address of the source (i.e. transmitter) and/or destination (i.e. receiver) then identifies the group instead of one client. The group of clients can be considered as "the client" in this case as transmissions are either directed to the group, thus all clients in the group or originate from one client in the group, which can only be identified as the group, not as a specific client in the group.

Here, the transmissions authenticity is checked against multiple eligible sender and/or recipient (single client or group) identifiers. Explicit addressing information—in the form of the short-address—is included only in an embodiment to narrow down the pool of eligible senders and/or recipients.

Assuming a communication network uses encryption and/or signatures with client specific keys for security reasons, the idea is to use information provided by the employed key as an example for the identifier to augment or replace any explicit addressing information in a transmission. Hence, the transmissions need to carry information which allows the receiver to verify the integrity and the authenticity of the transmission to effectively utilize the encryption and/or signature. For example common methods are various variants of message authentication codes (MAC) like CMAC or HMAC. The specific method can be arbitrary, as long as it allows the receiver to verify, that a transmission was encrypted and/or signed by the owner of a specific key. The verification of the mere integrity of the transmission on the side of the receiver is done in one embodiment separately on a lower layer or in a different embodiment with the authenticity verification.

Usually the transmission carries explicit addressing information which allows the recipient to associate the transmission with a source and/or destination. If the transmission is relevant for the receiver it also can select the according key based on the corresponding address. This key is then used to verify the authenticity via the system specific procedure (HMAC, CMAC, etc.). A successful verification confirms the association of the transmission with the owner of the according key, thus with one specific origin and/or destination if individual keys are used.

This means the explicit addressing information (e.g. by including the full address) is used in one embodiment of the receiver to select the key/identifier which is used to check the transmission's authenticity. When in one embodiment the explicit addressing information is reduced, forfeiting uniqueness, the same result is achieved by checking e.g. the authenticity against all keys as identifier of clients sharing the same partial address, i.e. the same short-address. Only the key of the actual client of origin and/or destination results in a valid verification. Thus the short-address as remaining explicit addressing information can be seen as an address hint. It does not identify a specific client but provides information about a subset of clients which contains the actual sender and/or recipient.

The omitted explicit addressing information is contained within the verification information (i.e. CMAC) of the transmission due to the identifier. This verification information is needed anyway to protect against forgery etc. Basically a transmission accidentally checked against a wrong client key is indifferent to any forged and/or corrupted transmission.

Inevitably the usage of the verification information to derive one of multiple eligible used keys (i.e. identifiers) weakens the protection against corrupted and/or forged packets as for every checked key one valid authentication sequence exists for every given packet data. This is compensated in one embodiment by extending the size of the authentication information if the same level of protection needs to be maintained. Authentication information in transmissions with a full explicit address though has to protect against attacks on a specific client. The addressing information in the authentication information on the other hand is hidden and attackers cannot target specific clients. The chance for a successful injection of forged data to one specific client is not increased by the supplementary usage of the authentication information for addressing. In other words an attacker can inject forged data to some client with increased probability though it cannot inject forged data to a specific target with increased probability.

Another advantage over independent addressing and authentication is the flexible and inherent utilization of available entropy for addressing and authentication. This implies in most cases the address space is much larger than the actual used address range, the size of the address space though is irrelevant for the reduction of protection against attacks.

In an embodiment, the signal generator is configured to modify the data content by performing an encryption of the data content using the identifier as an encryption key.

According to an embodiment of the transmitter, the signal generator is configured to modify the data content by adding a data validity signature based on the data content and/or on the identifier. In this embodiment, the signal generator calculates a data validity signature that is based on the data content and on the identifier. Further, the data content is modified by adding this data validity signature to the data content or, for example, to the encrypted/modified data content.

In an embodiment, the modification is done by encrypting the data content and by adding to the encrypted data content a data validity signature (e.g. CMAC) based on the data content. Hence, the validity of a decryption is verified by the receiver based on the data validity signature transferred by the emitted signal.

In an embodiment, no cryptographic procedures (encryption and/or signature) are performed by using pure integrity verification information (i.e. CRC) instead of authentication information. In this case a unique address of the client is implicitly included in the CRC and the recipient then checks the packet contents against the validity of every CRC expected for any eligible client. Though in this case the integrity verification information is usually scaled to just meet the system requirements towards rejection of corrupted transmissions and thus cannot be used for addressing purposes without increasing the size accordingly. For authentication information on the other hand the requirement of protection against specific attacks might be much higher in the first place. Then a reduction of the rejection abilities for generic corrupted packets might be tolerated as the protection against attacks on specific targets remains unharmed.

In a further embodiment, the signal generator is configured to generate the signal such that the signal carries at least one short-address. The short-address is associated with an address assigned to the transmitter and/or associated with an address assigned to the receiver. As mentioned in an embodiment above, the assignment happens in an embodiment via the fact that the transmitter or receiver belongs to a transmitter or receiver group, respectively, and that the address is assigned to the respective group. The short-address gives a hint towards the entire address. In a different embodiment, no explicit address information is comprised by the signal. In this embodiment, only the identifier allows the identification of the address.

According to an embodiment of the transmitter, the signal generator is configured to generate the signal such that the short-address has less bits than the address.

In an embodiment, the signal generator is configured to generate the signal such that the signal carries at least a part of the short-address by defining a physical way how the signal is emitted by the transmitter. The physical way defines at least one characteristic of the emitted signal, e.g. the frequency.

Here, the address hint given by the short-address is partially or entirely embossed onto the emitted signal in different embodiments by dividing the clients into subsets via transmission frequency, time slots, hopping patterns (see e.g. DE 10 2011 082 098 A1), or any other standard multiple access technique. For example if the network offers four distinct sub channels and the receiver knows which sub channel is used by each transmitter, the index of the used sub channel can be seen as two additional bits of the short-address.

According to an embodiment of the transmitter, the signal generator is configured to generate the signal such that the signal carries at least a part of the short-address by adding the short-address to the modified data content. In this embodiment, the short-address is explicitly added to the transferred data in order to be retrieved at the side of the receiver.

In an embodiment, the two foregoing embodiments are combined.

In an embodiment, the transmitter comprises a downlink signal receiver. The downlink signal receiver is configured to receive signals emitted by the receiver. Further, the signals emitted by the receiver comprise less data concerning short-addresses and addresses than the signals emitted by the transmitter.

An example is used to explain the foregoing embodiment:

Provided an LPWAN (Low Power Wide Arean Network) setup with one base station (i.e. the receiver) servicing a large number of nodes (i.e. transmitters) and each node communicating directly with a base station. Then only one key is needed for each node to identify the connection between the node and the base station. Merely the base station needs to manage multiple keys, one for every serviced node. Nodes only need to verify incoming downlink transmissions against their own key. Thus in downlink direction no explicit addressing information is needed unless it is needed to reduce the probability of accidental signature collisions. In uplink direction only the base station is needed to resolve any ambiguity of the reduced explicit addressing information. As the base station usually can utilize much higher computational performance than the nodes, a larger number of validity verifications can be tolerated. Also as the base station has access to all keys of the serviced nodes, it can detect accidental signature clashes in uplink and downlink direction after reception or before transmission respectively.

Therefore, the embodiment includes asymmetric address hints in uplink and downlink direction, i.e. different quantities concerning address or short-address information. In one additional embodiment, detection and handling of signature collisions in the base station for uplink and downlink transmissions is performed.

According to an embodiment, the transmitter is configured to obtain the identifier assigned to the transmitter and/or to obtain a rule for providing a short-address during an initialization step. The initialization step is performed before adding the transmitter to a system comprising at least the transmitter and the receiver. Hence, the initialization step happens before the activation of the transmitter, either by including it into a communication system or, for example, during manufacturing the transmitter. The rule for providing a short-address is in one embodiment the information about a mapping between an address and the short-address. In a different embodiment, the rule is the short-address.

According to an embodiment, the transmitter is configured to obtain the identifier assigned to the transmitter and/or to obtain a rule for providing a short-address during an initialization step. The initialization step is performed by the receiver providing the transmitter with the identifier and/or the rule. Here, the initialization step is performed after the transmitter became part of a system.

According to an embodiment, the transmitter is configured to obtain the identifier assigned to the transmitter and/or assigned to the receiver (the same holds for the transmitter group or the receiver group) and/or to obtain a rule for providing a short-address during an initialization step based on a preshared secret. The transmitter is configured to receive during the initialization step a nonce and a network key which is based on the nonce and the preshared secret and carries address information. Finally, the transmitter is configured to provide during the initialization step the nonce to the receiver and to receive in response to providing the nonce from the receiver a confirmation concerning the preshared secret. The main function of the network key is the encryption of the exchanged data. As for each combination of transmitter and receiver an individual network key is used, the network key carries also address information.

In an attachment procedure, the full, unique address or id of a node is transmitted initially in combination with additional information, needed for a key exchange. In an embodiment, a preshared secret is used as a basis for the key. The preshared secret is known to the sensor node and to some entity trusted by the owner of the sensor node like a key server. The attachment transmission then includes some information used as the seed or nonce to create a network key for the new connection. The nonce has to be different for every attachment procedure. The base station (i.e. the receiver) queries the key server with the nonce for the according network key. The transmitter and the key server utilize the same algorithm to deduce the network key from the preshared secret and the nonce. As a result the transmitter and the receiver have the same network key and can encrypt and/or sign further transmissions with this key.

In an embodiment, the transmitter is configured to obtain from the receiver an adapted identifier and/or an adapted rule during an adaptation step. The receiver is configured in this embodiment to identify a situation of the system comprising the transmitter and the receiver which needs an adaptation of the identifier or the rule on which the short-address is based. The transmitter on the other hand is configured to receive and to use such updated or adapted information.

In one embodiment, the size of the included address hint in form of the short-address can be adjusted to the specific characteristics of the setup of the system. For example, if the group of eligible clients, selected via the explicit addressing information, becomes too large, it might not be feasible for the recipient to check the transmission against all eligible clients. On the other hand in smaller networks, where the recipient can check every transmission against all keys, the explicit addressing information can be omitted entirely. The needed limitation of the eligible clients also depends on the costs of a validity verification check, which is dependent on the used cryptographic and/or hashing algorithms and the computational performance.

Therefore, the amount of explicit addressing information is chosen according to characteristics of the system like the number of clients or the costs for a verification attempt.

According to an embodiment, the transmitter is configured to detect the case when more than one receiver is able to evaluate a de-modification of the modified data content as valid. The generator is configured to adapt in this case a kind of modification applied to the data content. Hence, the generator changes the way of generating the signals to be emitted. Alternatively or additionally, the transmitter is configured to reject in this case the transmission of the signal. Hence, the transmitter refuses in this case the transmission of the signal. Hence, the transmitter detects in this embodiment the case when not only the addressed receiver but also other receivers are enabled to consider a de-modification as valid.

In some embodiments of the transmitter and/or of the receiver discussed before and in the following, collisions are detected.

If the recipient has access to all or some other keys assigned to other clients (as an example of the identifiers) it can detect collisions with these clients (with known keys) by attempting to verify the signature against all other keys as well. Transmissions not unanimously assignable can then be discarded or marked as potentially invalid. In the same way a transmitter with access to all recipient keys can check the signature against accidental matches with other clients, i.e. receivers, than the intended one and either refuse transmission or to perform an adaptation, e.g. by including a counter value in the packet data to resolve the signature collision a priori. When one authority can manage the keys and/or address hints it can also avoid static collisions by not assigning the same address hint to clients with the same key or vice versa.

Hence, features of some embodiments are:
Detecting collisions in the receiving and/or sending client with access to other clients' identifiers.
Resolving such collisions before sending by modifying information included in the signature like e.g. a counter. Hence, the kind of modification or the identifier is adapted.
The same is applied in order to avoid static collisions by assigning keys (i.e. identifiers) and/or address hints (i.e. rules for short-addresses) accordingly.

To avoid static clashes when multiple clients are associated with the same identifier and short-address (either accidentally or intentionally), a unique client identification or address is in an embodiment included additionally into the authentication information. This ensures that clashes between clients with identical cryptographic keys are not more likely than between clients with different keys.

Hence, in one embodiment, a unique address is injected into authentication procedure to avoid static clashes between clients with identical identifiers (e.g. cryptographic keys) and short-addresses.

The object is also achieved by a method for emitting at least one signal by a transmitter towards a receiver.

The method comprises at least the following steps:
providing data content,
modifying the data content using an identifier assigned to the transmitter or to the receiver, and
emitting the signal comprising the modified data.

The above discussed embodiments and features of the transmitter can also be realized via the method and vice versa.

The object is further achieved by a receiver for receiving at least one signal emitted by a transmitter.

The receiver comprises a data storage, a de-modifier and an evaluator. The data storage is configured to store identifiers and address information data assigned to the identifiers. The address information data refers to addresses assigned to transmitters and/or assigned to receivers. The de-modifier is configured to de-modify at least a part of transferred data comprised by the received signal using identifiers provided by the data storage. The evaluator is configured to verify whether a de-modification is valid.

The de-modifier applies the identifiers provided by the data storage to the de-modification of at least a part of the transferred data. The evaluator verifies which de-modification is (or which de-modifications are) valid. The identifier of a valid de-modification is (or the identifiers are) associated with address information data which allows to deduce the entire address either of the transmitter which emitted the received signal or of the receiver for which the signal was intended. Hence, a correct de-modification signals the fitting identifier which provides the information about the address which was not transmitted in its entirety within the signal. The case with more than one valid de-modification is a collision of which some embodiments take care of.

In an embodiment of the receiver, the evaluator is configured to verify based on data comprised by the received signal whether a de-modification is valid. In one embodiment, the transferred data comprises a data validity signature (e.g. CRC or any check-sum) of the data that was modified (e.g. encrypted) before the transmission. Such a data validity signature is also calculated for the de-modified data and compared with the data validity signature within the transferred data.

In an embodiment, the receiver further comprises an extractor. The extractor is configured to extract a short-address from the received signal. The data storage is configured to store data sets comprising identifiers and assigned address information data such that the data sets are associated with short-addresses. The de-modifier is configured to de-modify at least a part of the transferred data using only identifiers belonging to a data set associated with the extracted short-address. The short-address is mapped to the actual address (of the transmitter, the receiver, a transmitter group or a receiver group) and serves as an address hint to limit the number of identifiers which are used by the de-modifier for the de-modification.

According to an embodiment of the receiver, the de-modifier is configured to de-modify at least a part of the transferred data using all identifiers belonging to the data set associated with the extracted short-address. This embodiment allows to detect collisions.

In an embodiment, the de-modifier is configured to de-modify by performing a decryption using at least a part of the identifier as at least a part of a decryption key. Based on the decrypted data, the evaluator performs the verification whether the decryption provides valid data.

According to an embodiment of the receiver, the evaluator is configured to verify the de-modifications by comparing a data validity signature comprised by the received signal with a data validity signature based on extracted data content provided by the de-modifier and/or based on the identifier. Here, a data validity signature based on extracted, i.e. de-modified, data content provided by the de-modifier and/or based on the identifier is compared with a data validity signature comprised by the transferred data and thereby calculated based on the original data content and/or the modified data content. A positive comparison indicates that the identifier used for the de-modification (e.g. decryption) is correct.

In an embodiment, the extractor is configured to extract the short-address based on a physical way how the signal is emitted by the transmitter. Here, the physical characteristics of the received signal are associated with the short-address.

According to an embodiment of the receiver, the extractor is configured to identify a part of the transferred data as the short-address and to remove the identified part from the transferred data. In this embodiment, the extractor removes a part from the transferred data that was identified as the short-address.

According to an embodiment, the receiver comprises a downlink signal emitter. The downlink signal emitter is configured to emit signals to be received by the transmitter. The downlink signal emitter is configured to emit signals comprising less data concerning short-addresses and/or addresses than the signals emitted by the transmitter. Here, the transmitter emits signals with more information concerning the address and/or short-addresses than the receiver.

In an embodiment, the receiver is configured to perform an initialization step providing the transmitter with the identifier assigned to the transmitter and/or assigned to the receiver and/or a rule for providing a short-address. The rule is in an embodiment the short-address.

According to an embodiment of the receiver, the receiver is configured to perform an initialization step providing the transmitter with the identifier and/or a rule for providing a short-address based on a preshared secret. The receiver is configured to receive during the initialization step a nonce from the transmitter. The receiver is configured to submit a query concerning the network key using the nonce to a key server and to receive in response to submitting the query from the key server a network key. The receiver is configured to provide during the initialization step the transmitter with a confirmation concerning the preshared secret.

In the foregoing embodiment, the short-address and/or a rule for a short-address and/or identifiers are determined in an initialization step. In a different embodiment, the respective parameters for the communication are preassigned via a side channel.

In a further embodiment, the attachment request is signed with the preshared secret (otherwise named preshared secret key) to confirm authenticity. The attachment confirmation is implicitly authenticated as it is encrypted and signed with the network key, which can only be obtained from an entity with access to the preshared secret. Replay attacks are avoided in an embodiment by including an additional strictly incrementing attachments counter in the signed transmissions.

This leads to the following features: Derive the encryption key from a preshared secret and some non-secret information (here the nonce), which is transmitted in the attachment procedure. The network only gains access to the derived network key, the preshared secret does not leave the user domain.

In a further embodiment, the preshared secret is used for user level end-to-end encryption. In another embodiment, a counter or other cryptographic meta information is reused from the network level encryption to reduce the overhead in the user level encryption.

In an embodiment, the short-addresses and/or identifiers are changed for security or system performance reasons.

In an embodiment, the receiver is configured to dynamically provide the transmitter with an adapted identifier and/or an adapted rule for providing a short-address during an adaptation step based on a currently given setup of a system in which the receiver and the transmitter are located. For example, if the number of transmitters or receivers in the system changes, an adaptation happens.

According to an embodiment, the receiver is configured to provide the transmitter with the adapted identifier and/or the adapted rule based on a number of transmitters emitting signals within the system and/or based on an effort for de-modifying the transferred data and/or based on a needed resistance against forgery attempts and/or based on a maximum tolerated probability for cases when more than one identifier enables a valid verification of the de-modification by the evaluator.

In an embodiment, the evaluator is configured to detect the case when more than one identifier enables a valid de-modification of the transferred data. The evaluator further is configured to initiate in this case the adaptation step. Here, a collision of identifiers is detected and leads to an adaption of the parameters (e.g. identifiers and short-addresses).

According to an embodiment, the evaluator is configured to detect the case when more than one identifier enables a valid de-modification of the transferred data. The evaluator is configured to discard in this case extracted data content provided by the de-modifier.

In an embodiment, the evaluator is configured to discard extracted data content provided by the de-modifier in case the identifier enabling a valid de-modification is assigned to address information data referring to a different receiver. Here, the receiver discovers that the received signal was designated for a different receiver.

When arbitrary data is transmitted, there might be a combination of data and key which accidentally produces a valid signature for another client than the actual recipient. This probability of a signature collision is basically the same as the probability to accidentally accept a random (i.e. forged and/or corrupted) identifier as valid. Though it has to be considered, that without explicit unique addressing information, the system by design provides invalid packets to clients which might be accidentally accepted. Accordingly the clients cannot employ equally strict brute force countermeasure techniques like refusing further reception after several consecutive invalid, potentially forged, packets. So when choosing the size of the signature and short-address the probability of signature collisions has to be reduced to a level acceptable for the system. Specifically a larger short-address reduces the number of invalid packets intentionally provided to the client which allows stricter brute force countermeasures to be used. A larger signature reduces the probability of accepting any invalid packet as valid which allows employing less strict brute force countermeasures. The collision probability can be reduced either way.

Therefore, in an embodiment the size of the short-address and/or the identifier are chosen to reduce the collision probability to a certain level and/or to allow enforcing a certain level of brute force countermeasures.

Including only ambiguous or no explicit addressing information in the data transferred by the signals is also useful to obfuscate the sender and/or recipient. Third parties without access to the identifiers (e.g. keys) cannot reliably gather meta information or statistical data for specific clients. This obfuscation can be extended by utilizing additional methods to change the address hint in between transmissions. For example by employing PRN sequences or by deriving the address hint from changing meta data.

The object is also achieved by a method for receiving at least one signal emitted by a transmitter.

The method comprises at least the following steps:
  de-modifying transferred data comprised by the received signal using identifiers, and
  verifying whether a de-modification of the transferred data is valid.

The above discussed embodiments and features of the receiver can also be realized via the method and vice versa.

An embodiment comprises the steps:
  Obtaining address information data associated with the identifier allowing a valid de-modification.
  Deducing based on the obtained address information data the address of the transmitter (or the transmitter group) or the address of the receiver (or the receiver group) for which the received signal is designated.

The object is achieved by a system comprising at least one transmitter according to any of the above discussed embodiments and comprising at least one receiver according to any of the discussed embodiments.

The invention—either realized by the transmitter, the receiver, the system or a corresponding method—is based in some embodiments on at least some of the following aspects:

- If every transmission is encrypted as an embodiment of the modification with a client or group specific key, the key (i.e. the identifier) contains addressing information.
- In one embodiment, the transferred data contains error checking/authentication information to allow verifying correctly decrypted data.
- If an identifier available to the receiver decrypts the transferred data to a valid data packet (CRC, signature, etc. are verified), then the transmission has been encrypted with the specific identifier and therefore is associated to the according client.
- The explicit address in the transmission is reduced in an embodiment to provide only sufficient preselection, limiting the futile decryption attempts.
- In a different embodiment, explicit address is omitted entirely if a preselection is not needed.
- If the keys/signatures cannot be guaranteed to be unique, the preselection address is used in one embodiment to reduce the probability of key/signature clashes to acceptable levels.
- For 128 bit keys the probability of key clashes is very low even in uncoordinated scenarios.
- Unique address can be included to signature process additionally to avoid static clashes due to identical keys.
- Similar principle can be applied without cryptography by including a unique address in a CRC or other integrity verification data but not in the packet and trying to match the CRC in the receiver.
- Assignment of shorter addresses and keys during an initial step being the sole step in which a full address needs to be explicitly included in the transmitted data content.
- In an embodiment, a dynamically adapting of the rule for providing the short-address as a hint is performed.
- Detect collisions in clients with access to other keys by checking against all keys, resolve collisions by incrementing packet counter etc.
- The address hint based on the short-address is in one embodiment explicit via adding the short-address to the transferred data. In a different embodiment, this happen implicit via slot, time, frequency etc. as a physical characteristic of the emitted signal.

BRIEF DESCRIPTION OF THE DRAWINGS

Embodiments of the present invention will be detailed subsequently referring to the appended drawings, in which.

DETAILED DESCRIPTION OF THE INVENTION

In the following, FIGS. 1 to 4 will be discussed together.

Figure 1:
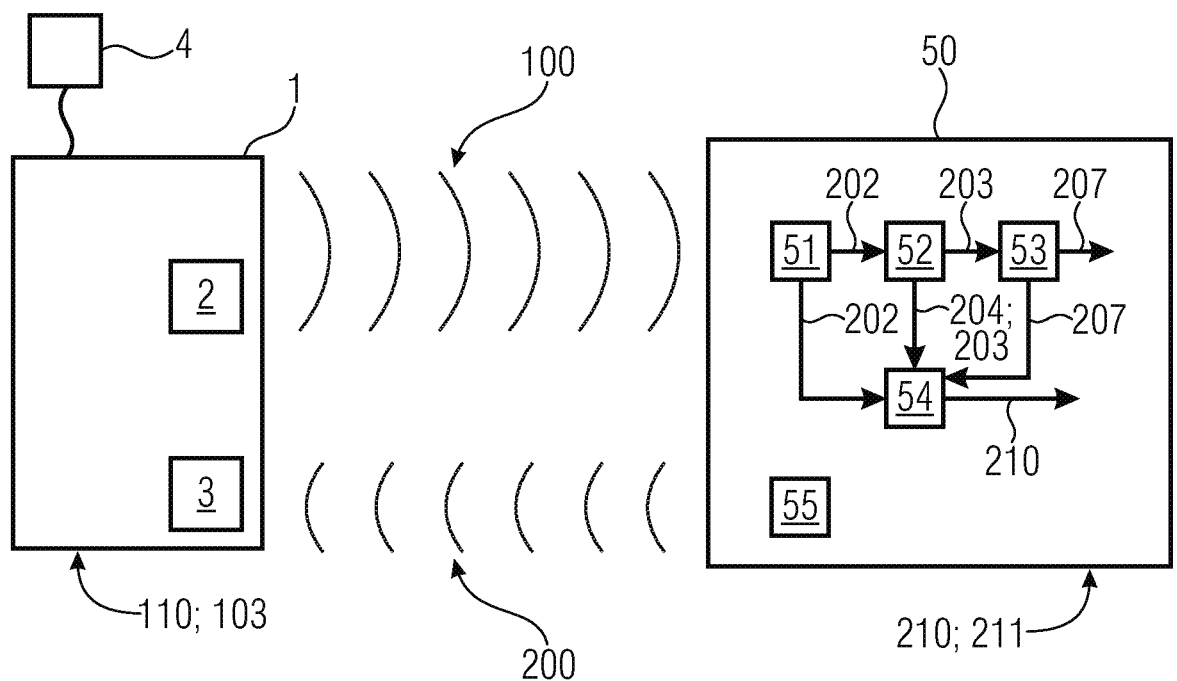
FIG. 1 shows an example of a system with a transmitter and a receiver.

FIG. 1 shows an embodiment of a communication system with a transmitter 1 and a receiver 50. The transmitter 1 and the receiver 50 are configured to allow an uplink from the transmitter 1 to the receiver 50 as well as a downlink from the receiver 50 to the transmitter 1.

The transmitter 1 comprises for the uplink a signal generator 2 that refers for generating a signal 100 to be transmitted in the shown embodiment to an address 110 (or more precisely: to a short-address 102 (see FIG. 2) assigned to the address with a mapping known to the transmitter 1 and to the receiver 50) and to an identifier 103. The address 110 and the identifier 103, both, are assigned to the transmitter 1. In a different embodiment, the address 110 and/or the identifier 103 are/is assigned to a group of transmitters to which the shown transmitter 1 belongs. In this case, an address and/or identifier is assigned to the respective group and by belonging to the group also to the transmitter and/or receiver, respectively.

The address 110 is assigned to the transmitter 1 in one embodiment during manufacturing of the transmitter 1 or generally during an initialization step before adding the transmitter 1 to the system. In a different embodiment, the address 110 is assigned to the transmitter 1 after the transmitter 1 is added to the system e.g. by the receiver 50 or another central unit.

The identifier 103 is also assigned—before or after adding the transmitter 1 to the system, usually together with the short-address or rule for generating the short-address—to the transmitter 1 and helps to verify—at the side of the receiver 50—whether a received signal stems from the transmitter 1.

Figure 2:
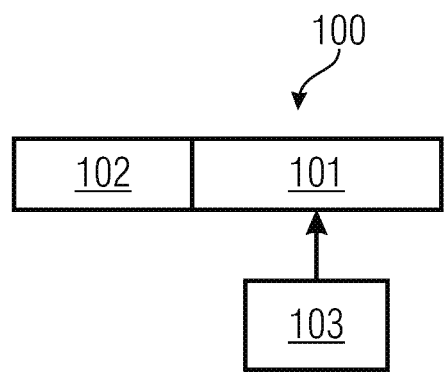
FIG. 2 illustrates schematically a signal emitted by the transmitter.

An example of a signal 100 to be emitted by the transmitter 1 is shown schematically in FIG. 2.

The signal 100 comprises a data content 101 and a short-address 102. The data content 101 refers e.g. to measurement data provided by a sensor 4 (compare FIG. 1). The short-address 102 is associated with the address 110 of the transmitter 1 having less bits than the entire address 110. The rule for providing based on the address 110 the short-address 102 and by this the kind of mapping used is known to the transmitter 1 and to the receiver 50.

As the short-address 102 is an abbreviated version of the address 110 with less information, the short-address 102 does not refer only to the transmitter 1 but to a plurality or group of transmitters which all share the same short-address 102. Thus, the short-address 102 is just a hint to the full address 110 and to the specific transmitter 1. The short-address 102 is derived by a specified rule from the address assigned to the transmitter 1 and allows to limit the plurality of transmitters within the communication system to a group whose transmitter share the same short-address. The short-address 102 is an explicit information allowing the receiver 50 to focus the steps of handling the received signals on the group of transmitters associated with the short-address 102. The modification based on the identifier 103 allows the receiver 50 to verify the data content 101 and to deduce the specific transmitter that emitted the signal.

This lacking information which is lost due to the reduction of the address 110 to the short-address 102 is added to the signal 100 by the signal generator 2 by modifying the data content 101 using the identifier 103 assigned to the transmitter 1.

In an embodiment, no short-address is submitted via the signal 100. In this embodiment, the identification of the transmitter 1 relies on the identifier 103 used for modifying the data content 101.

In a different—not shown—embodiment the short-address 102 defines the physical or technical way how the signal 100 is emitted. For example, the short-address 102 is a carrier frequency to be used for emitting the signals 100. In this case the receiver 50 deduces from the frequency of the received signal the short-address.

The identification of the specific transmitter 1—or more precisely: the address assigned to the transmitter—within the group of transmitters with the same short-address is realized by the receiver 50 using identifiers 203 provided by a data storage 52 which is here part of the receiver 50 and is in a different embodiment a separate unit, e.g. located within a cloud.

The identifier which allows the receiver 50 to de-modify correctly the transferred data 205 comprised by the received signal 100 tells the receiver 50 from which transmitter the signal was emitted as the identifiers provided by the data storage 52 are associated with address information data 204 allowing to identify the transmitter 1.

In one embodiment, the address information data 204 refers to the data lost due to the reduction of the entire address to the short-address. In this embodiment, the short-address is combined with the address information data 204 to obtain the entire address. In a different embodiment, the address information data 204 is already the entire address.

To sum up, the identification of the transmitter 1 is based on the question which identifier 203 fits to the signal 100 and is based on data at the receiving side which shows the relationship between identifiers 103 and transmitters 1 or addresses 110 of transmitters 1.

In the discussed embodiment, the information about the transmitter as the signal source is included into the emitted signal 100. This also holds for including data about the receiver 50 or about the transmitter and the receiver.

In the shown embodiment of FIG. 1, the receiver 50 comprises an extractor 51, a data storage 52 (compare FIG. 4), a de-modifier 53 and an evaluator 54 that deal with the signals 100 received by the receiver 50.

The extractor 51 extracts a short-address 202 from the received signal 100. The short-address 202 is in one embodiment a part of the transferred data 205 transferred with the signal 100 (compare FIG. 3). In a different embodiment, the signal 100 carries the short-address 202 by the physical characteristics of the signal 100. The extracted short-address 202 is provided by the extractor 51 to the data storage 52 and to the evaluator 54.

Figure 3:
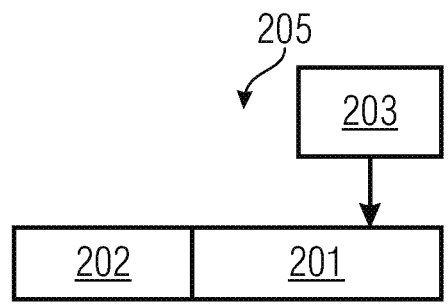
FIG. 3 illustrates schematically a signal received by the receiver.

The received signal 100 comprises transferred data 205 that is shown schematically in FIG. 3.

The transferred data 205 comprises in the shown embodiment the short-address 202 and the modified data content 201. The short-address 202 can be identified by the extractor 51 as a part of the transferred data 205 and is removed in the shown embodiment from the transferred data 205.

The de-modifier 53 in the embodiment shown in FIG. 1, thus, de-modifies the rest of the transferred data 205 containing only the modified data content 201. The modified data content 201 is the result of the modification at the transmitter side using the identifier. Accordingly, the de-modifier 53 applies different identifiers 203 to the modified data 201 until the correct or fitting identifier 203 is found which allows to obtain the extracted data content 207. If no identifier allows a valid de-modification, the receiver 50 discards in one embodiment the received signal 100.

Figure 4:
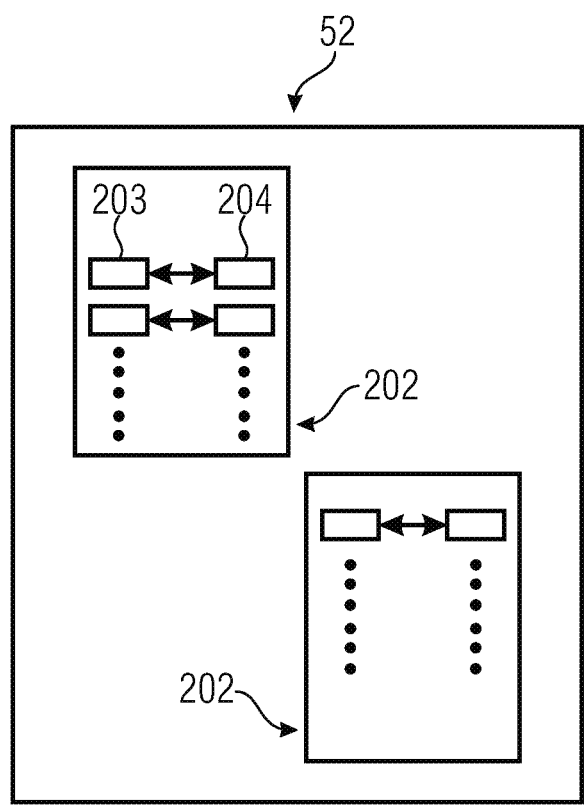
FIG. 4 shows schematically the content of a data storage comprised by the receiver.

The data storage 52 is shown with more details in FIG. 4.

The data storage 52 comprises various identifiers 203 which are assigned to address information data 204. Further, the assignments are related to different short-addresses 202. Hence, the currently relevant short-address 202 provided by the extractor 51 limits the different assignments to a reduced number and especially to one data set.

The data storage 52 in the following provides the de-modifier 53 with the identifiers 203 of the data set that is associated with the short-address 202 extracted by the extractor 51.

The de-modifier 53 applies in the shown embodiment all identifiers 203 to the de-modification of the transferred data 205 to obtain extracted data content 207.

The evaluator 54 verifies which identifier 203 enables the de-modifier 53 a correct de-modification. This is done, for example, as follows: the de-modifier 53 performs a decryption using the identifiers 203. The evaluator 54 calculates a data validity signature for the decrypted data and compares it with a value comprised by the transferred data 205. If there is a difference, then the de-modifier 53 did not use the correct identifier. If the data validity signature and the calculated value are the same, then the de-modification was correct and the correct identifier 203 was used.

Based on a positive result of the evaluator 54, the address information data 204 associated with the correct identifier 203 is used to identify the transmitter 1 and the evaluator 54 provides the entire address 210.

Finally, in the shown embodiment, the entire address 210 and the extracted data content 207 are output.

The embodiment shown in FIG. 1 also allows a downlink data transfer from the receiver 50 to the transmitter 1. For this purpose, the receiver 50 comprises a downlink signal emitter 55 and the transmitter 1 comprises a downlink signal receiver 3.

In an embodiment, the downlink communication is realized like the described uplink communication.

Here, for the uplink, the transmitter 1 includes information about its address 110 into the emitted signals 100 in order to show that the signals 100 stem from the specific transmitter 1. For the downlink, the receiver 50 also includes information about the address 110 into the downlink signals 200 to ensure that the correct transmitter 1 reads the signals 200.

In an embodiment, the downlink is free from any explicit address information and the receiver 50 just applies the identifier 103 assigned to the transmitter 1 for modifying the data to be transmitted by the downlink signals 200. In this case, the transmitter 1 only applies its identifier 103 to the de-modification of the data transferred by the downlink signal 200 and sees whether it allows a correct de-modification.

In a different embodiment, e.g. in a system with more than one receiver, the shown receiver 50 also uses its address 210 and its own identifier 211 for generating the downlink signals 200.

To sum up, the described communication has at least some of the following features:
  In order to reduce the amount of transmitted data of the emitted signals, the address of the transmitter and/or of the receiver (or the respective groups to which the transmitter or receiver belongs) is not transferred in its entirety but either in an abbreviated version as a short-address or it is completely omitted.

The lacking information concerning the sending and/or receiving address is compensated by using an identifier for modifying the data content which is transferred by the signals.

The receiver of the signals comprises a plurality of identifiers which are assigned to addresses. Using these identifiers, the receiver tries to de-modify the data transferred by the signal and validates the fitting identifier (or the fitting identifiers) which allows a correct de-modification. Based on the correct identifier and based on the information about the relation between the identifiers and the addresses, the receiver deduces the address of the transmitter or the group to which it belongs and/or the address of the receiver or its group.

Figure 5:
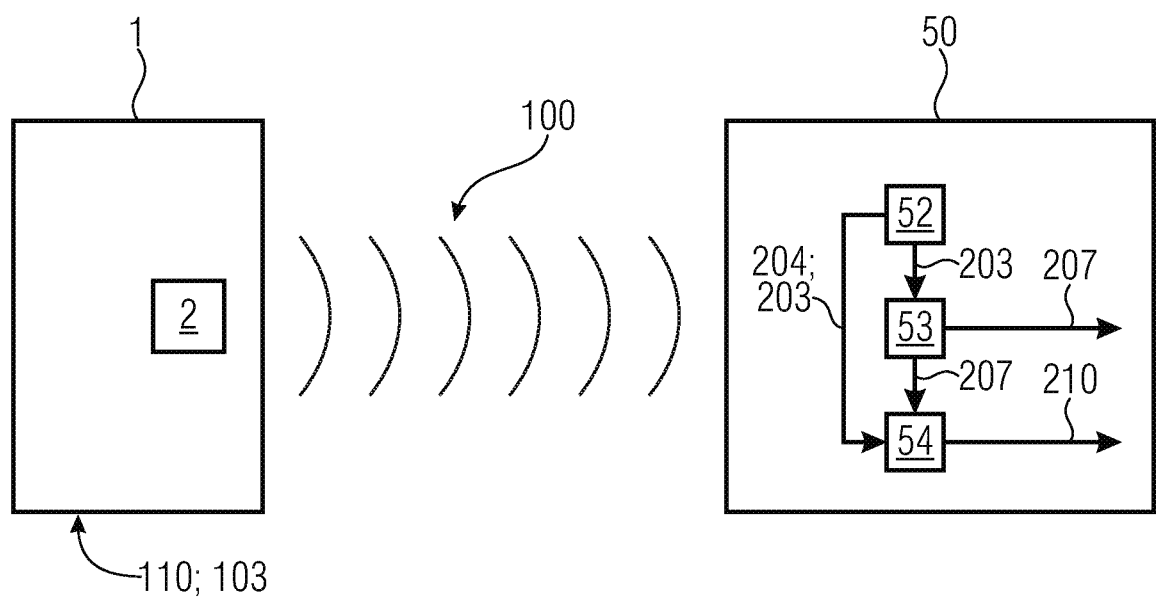
FIG. 5 shows a different example of a system with a transmitter and a receiver.

In FIG. 5 a different embodiment of the system is shown in which only uplink communication happens and the transmitter 1 is not able to receive signals. Further, no short-address is used by the transmitter 1 due to which the receiver 50 does not involve an extractor.

The received signal 100 is here submitted to the de-modifier 53 which tries to de-modify the signal 100 using the identifiers 203 provided by the data storage 53.

Figure 6:
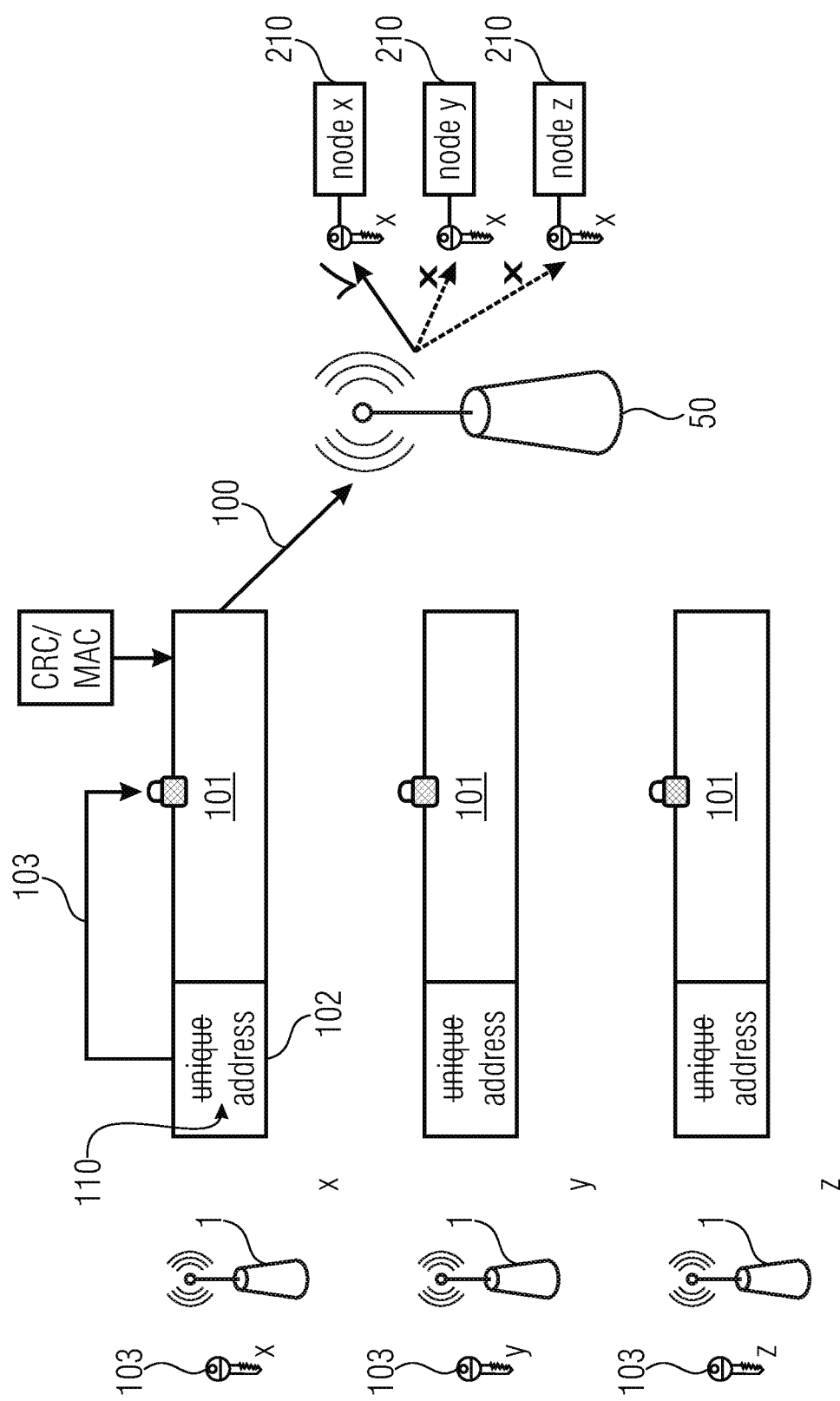
FIG. 6 shows a further example of a system with various transmitters and a receiver.

FIG. 6 shows a system with three transmitters 1 as sensor nodes, called here x, y and z and one receiver 50 as a basis station.

Each of the three transmitters 1 has its own unique address and has an identifier 103. In a different embodiment, two transmitters 1 belong to a transmitter group and use the same identifier 103.

Each transmitter 1 allows to generate signals. The unique address 110 of the respective transmitter 1 is not transferred but a short address 102 which can be shared by various transmitters. Nevertheless, the identifier 103—and here especially the key assigned to the specific transmitter and used for encoding the data content or for being added to the data content for generating a kind of checksum, e.g. a CRC—of the transmitter 1 provides the information needed for obtaining the entire address 110 and for identifying the emitting transmitter or the group to which the transmitter belongs.

The identifier 103 is used for modifying the data content 101 of the signal 100. Modifying refers to modifying the data content 101 as such or to adding some kind of information which can be performed in an embodiment by calculating e.g. a CRC for the data content plus the identifier and not only for the data content.

The receiver 50 tries to de-modify the received signal 100 using available identifiers. As in the shown embodiment, the signal 100 is emitted by transmitter x, only identifier x will result in a valid de-modification. Hence, the data assigned to this identifier allows the receiver 50 to gather that the signal 100 stems from this transmitter x.

Figure 7:
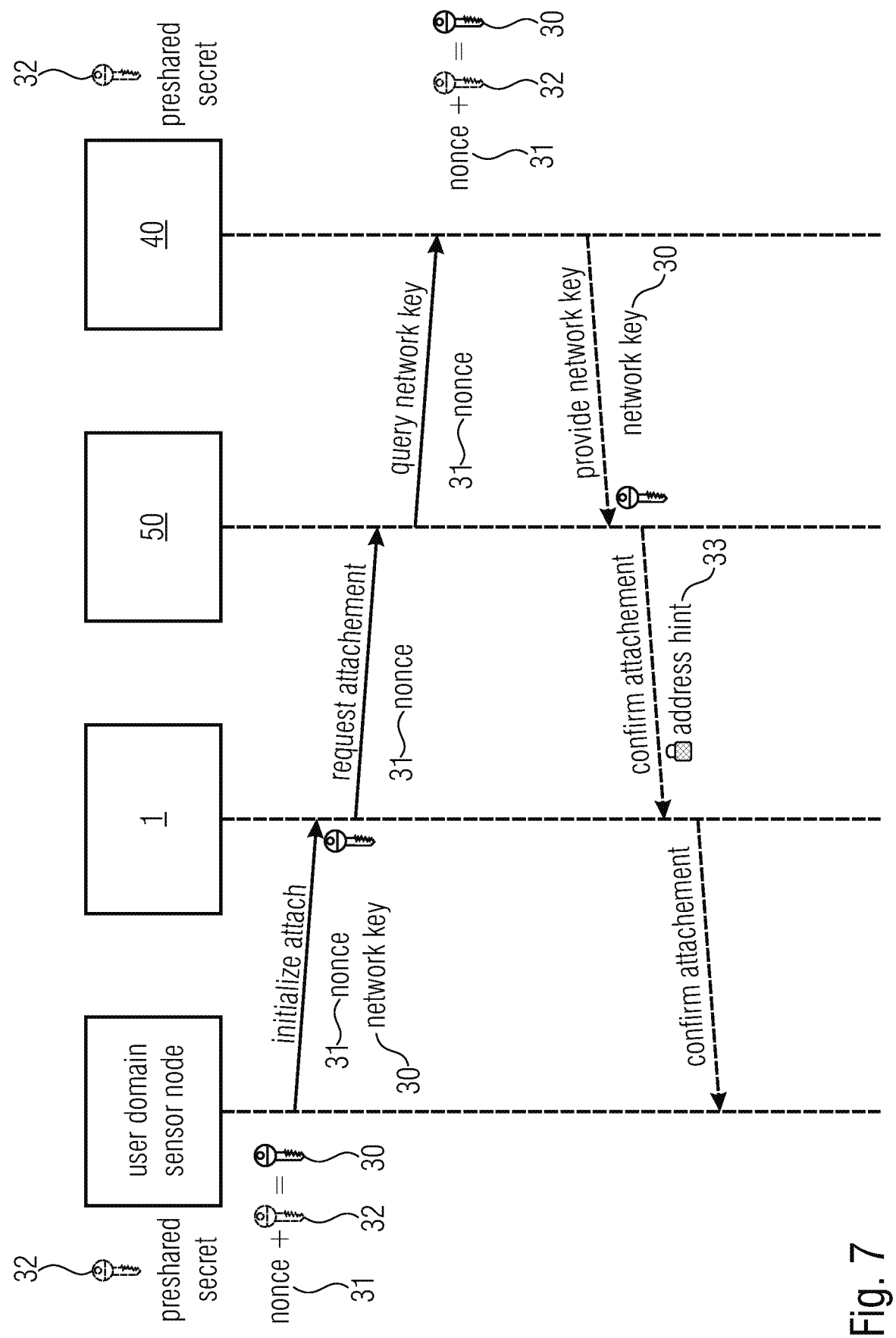
FIG. 7 illustrates an embodiment of network key generation and address hint assignment via attachment procedure.

In FIG. 7 an embodiment of the assignment of identifiers (here keys as an example) and/or short-addresses is shown.

In an initial step each client in the network, here in the system, needs to be associated with a client specific cryptographic key for encryption and/or signature purpose and a short address or address hint. This is either done in one embodiment by assigning these parameters to the clients externally (i.e. via a different channel) and then providing this information to the network or in a different embodiment via an attachment procedure within the network.

Specifically for LPWAN setups the base station (here the receiver 50) might have the authority to assign address hints to the nodes—i.e. the transmitters—and negotiate cryptographic keys. The base station (the receiver 50) might also accept preassigned address hints and/or keys via another channel. The second option is mandatory for the operation of unidirectional nodes, which cannot receive any downlink data. The side channel might be the download of the node firmware at production or initialization of the node or any local interface like serial, NFC, etc. which allows reconfiguration of the node.

If an attachment procedure is used, the full, unique address or id of a transmitter 1 (or here: node) is transmitted initially in one transmission alongside with additional information, needed for a key exchange. The key exchange might be achieved via cryptographic standard procedures (i.e. Diffie-Hellman) or can be based on a preshared secret.

For LPWAN applications with very limited network capacity usual key exchange procedures are less suitable as these involve the transmission of large prime numbers, elliptic curves, etc.

In this case and in the shown embodiment, a preshared secret 32 is used as the basis for the key. This preshared secret 32 is known to the transmitter 1 and to some entity trusted by the owner of the sensor node like, in the shown embodiment, a key server 40.

The attachment transmission then includes some information used as the seed or nonce 31 to create a network key 30 for the new connection. The nonce 31 is in one embodiment different for every attachment procedure. The base station 50 can query the key server 40 with the nonce 31 for the according network key 30. The sensor node (here the user domain sensor node) and the key server 40 utilize the same algorithm to deduce the network key 30 from the preshared secret 32 and the nonce 31.

In one embodiment, the employed algorithm does not allow recovery of the preshared secret 32 from the generated network key 30. The preshared secret 32 i.e. might be an encryption key itself and the algorithm might then be the encryption of the nonce 31 with the preshared secret key. In this case the encryption algorithm needs to be resistant against known plaintext attacks. The nonce might also be extended with other information available to the transmitter and key server like IDs or counters. As a result the node 1 and the base station 50 have the same network key and can encrypt and/or sign further transmissions with this key.

The assignment of the address hint is encrypted in an embodiment to obfuscate the node to address hint mapping for third parties.

The preshared secret 32 never leaves the domain of the owner of the node, the base station 50 only gains access to the network key 30 to be used for the communication with the specific transmitter 1.

Attaching the same node at a different base station, using a different nonce, results in a new network key, not known to previous base stations.

In an embodiment, the attachment request from the transmitter 1 to the receiver 50 is signed with the preshared secret 32 to confirm authenticity. The attachment confirmation is implicitly authenticated as it is encrypted and signed with the network key 30, which can only be obtained from an entity with access to the preshared secret 32.

Replay attacks are avoided in an embodiment by including an additional strictly incrementing attachments counter in the signed transmissions.

The preshared secret 32 is used in an embodiment for a second level of encryption to gain end-to-end security for the user data. This is especially useful in scenarios where the system is not controlled by the user and potentially not trustworthy. For example a public or foreign base station might be used to communicate with a transmitter. In this case the receiver 50 as base station can only access the network level needed for the operation of the network. The user data in the transmissions remains opaque and is merely forwarded to the user domain. Additional preshared secret 32 based signatures or other verification information in the user data can be used to ensure integrity and authenticity on the user level. To reduce the overhead for the second encryption level it might utilize some information from the network level encryption. For example a counter for replay attack protection can be provided by the network level to the user level. The additional user level verification might also be used to catch un-handled signature collisions on the network level and discard the invalid data.

In a scenario where the receiver 50 has the authority to assign address hints and/or negotiate cryptographic keys, the base station 50 might also reassign or adapt those parameters. This can be done to increase security, improve client obfuscation or to avoid signature clashes (same key and address hint). In the last case though it is important to ensure no information about keys can be gained by attackers via the attempt to register additional clients and monitor a reassignment of address hints and/or keys.

Although some aspects have been described in the context of an apparatus, it is clear that these aspects also represent a description of the corresponding method. Analogously, aspects described in the context of a method step also represent a description of a corresponding block or item or feature of a corresponding apparatus.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A transmitter for emitting at least one signal towards a receiver, wherein the transmitter comprises a hardware signal generator,
    wherein the signal generator is configured to generate the signal to be emitted by the transmitter,
    wherein the signal generator is configured to generate the signal such that the signal comprises data content, and
    wherein the signal generator is configured to generate the signal by modifying the data content using an identifier assigned to the transmitter or assigned to the receiver,
    wherein the signal generator is configured to generate the signal such that the signal carries at least one short-address based on an address assigned to the transmitter or based on an address assigned to the receiver,
    wherein the signal generator is configured to generate the short-address such that the short-address comprises less bits than the address assigned to the transmitter or the address assigned to the receiver.

2. The transmitter of claim 1, wherein the signal generator is configured to generate the signal such that the signal is free of an address assigned to the transmitter or free of an address assigned to the receiver in its entirety.

3. The transmitter of claim 1,
    wherein the transmitter belongs to a transmitter group or the receiver belongs to a receiver group, and
    wherein the identifier is assigned to the transmitter group or to the receiver group.

4. The transmitter of claim 1,
    wherein the signal generator is configured to modify the data content by performing an encryption using the identifier as an encryption key.

5. The transmitter of claim 1,
    wherein the signal generator is configured to modify the data content by adding a data validity signature based on the data content or based on the identifier.

6. The transmitter of claim 1,
wherein the signal generator is configured to generate the signal such that the signal carries at least a part of the short-address by defining a physical way how the signal is emitted by the transmitter.

7. The transmitter of claim 1,
wherein the signal generator is configured to generate the signal such that the signal carries at least a part of the short-address by adding the short-address to the modified data content.

8. The transmitter of claim 1,
wherein the transmitter comprises a downlink signal receiver,
wherein the downlink signal receiver is configured to receive signals emitted by the receiver, and
wherein the signals emitted by the receiver comprise less data concerning short-addresses or addresses than the signals emitted by the transmitter.

9. The transmitter of claim 1,
wherein the transmitter is configured to acquire the identifier assigned to the transmitter or assigned to the receiver or to acquire a rule for providing a short-address during an initialization step, and
wherein the initialization step is performed before adding the transmitter to a system comprising at least the transmitter and the receiver.

10. The transmitter of claim 1,
wherein the transmitter is configured to acquire the identifier assigned to the transmitter or assigned to the receiver or to acquire a rule for providing a short-address during an initialization step, and
wherein the initialization step is performed by the receiver providing the transmitter with the identifier or the rule.

11. The transmitter of claim 1,
wherein the transmitter is configured to acquire the identifier assigned to the transmitter or assigned to the receiver or to acquire a rule for providing a short-address during an initialization step based on a pre-shared secret, and
wherein the transmitter is configured to receive during the initialization step a nonce and a network key which is based on the nonce and the preshared secret and carries address information, and
wherein the transmitter is configured to provide during the initialization step the nonce to the receiver and to receive in response to providing the nonce from the receiver a confirmation concerning the preshared secret.

12. The transmitter of claim 1,
wherein the transmitter is configured to acquire from the receiver an adapted identifier or an adapted rule during an adaptation step.

13. The transmitter of claim 1,
wherein the transmitter is configured to detect the case when more than one receiver is able to evaluate a de-modification of the modified data content as valid, and
wherein the generator is configured to adapt in this case a kind of modification applied to the data content or wherein the transmitter is configured to reject in this case the transmission of the signal.

14. A method for emitting at least one signal by a transmitter towards a receiver,
wherein the method comprises at least:
providing data content,
modifying the data content using an identifier assigned to the transmitter or assigned to the receiver,
emitting the signal comprising the modified data content,
wherein the signal carries at least one short-address based on an address assigned to the transmitter or based on an address assigned to the receiver,
wherein the short-address such that the short-address comprises less bits than the address assigned to the transmitter or the address assigned to the receiver.

15. A receiver for receiving at least one signal emitted by a transmitter, wherein the receiver comprises a non-transitory data storage, a de-modifier and an evaluator,
wherein the data storage is configured to store identifiers and address information data assigned to the identifiers, where the address information data refers to addresses assigned to transmitters or assigned to receivers,
wherein the de-modifier is configured to de-modify at least a part of transferred data comprised by the received signal using identifiers provided by the data storage, and wherein the evaluator is configured to verify whether a de-modification is valid,
wherein the receiver further comprises an extractor,
wherein the extractor is configured to extract a short-address from the received signal,
wherein the data storage is configured to store data sets comprising identifiers and assigned address information data such that the data sets are associated with short-addresses, and
wherein the de-modifier is configured to de-modify at least a part of the transferred data using only identifiers belonging to a data set associated with the extracted short-address.

16. The receiver of claim 15,
wherein the evaluator is configured to verify based on data comprised by the received signal whether a de-modification is valid.

17. The receiver of claim 15,
wherein the de-modifier is configured to de-modify using all identifiers belonging to the data set associated with the extracted short-address.

18. The receiver of claim 15,
wherein the de-modifier is configured to de-modify by performing a decryption using at least a part of the identifiers as at least a part of decryption keys.

19. The receiver of claim 15,
wherein the evaluator is configured to verify the de-modifications by comparing a data validity signature comprised by the received signal with a data validity signature based on extracted data content provided by the de-modifier or based on the identifier.

20. The receiver of claim 15,
wherein the extractor is configured to extract the short-address based on a physical way how the signal is emitted by the transmitter.

21. The receiver of claim 15,
wherein the extractor is configured to identify a part of the transferred data as the short-address and to remove the identified part from the transferred data.

22. The receiver of claim 15,
wherein the receiver comprises a downlink signal emitter,
wherein the downlink signal emitter is configured to emit signals to be received by the transmitter, and
wherein the downlink signal emitter is configured to emit signals comprising less data concerning short-addresses or addresses than the signals emitted by the transmitter.

23. The receiver of claim 15,
wherein the receiver is configured to perform an initialization step providing the transmitter with the identifier assigned to the transmitter or assigned to the receiver or with a rule for providing a short-address.

24. The receiver of claim 15,
wherein the receiver is configured to perform an initialization step providing the transmitter with the identifier or a rule for providing a short-address based on a pre shared secret,
wherein the receiver is configured to receive during the initialization step a nonce from the transmitter,
wherein the receiver is configured to submit a query concerning the network key using the nonce to a key server and to receive in response to submitting the query from the key server a network key, and
wherein the receiver is configured to provide during the initialization step the transmitter with a confirmation concerning the preshared secret.

25. The receiver of claim 15,
wherein the receiver is configured to dynamically provide the transmitter with an adapted identifier or an adapted rule for providing a short-address during an adaptation step based on a currently given setup of a system in which the receiver and the transmitter are located.

26. The receiver of claim 25,
wherein the receiver is configured to provide the transmitter with the adapted identifier or the adapted rule based on a number of transmitters emitting signals within the system or based on an effort for de-modifying the transferred data or based on a needed resistance against forgery attempts or based on a maximum tolerated probability for cases when more than one identifier enables a valid verification of the de-modification by the evaluator.

27. The receiver of claim 25,
wherein the evaluator is configured to detect the case when more than one identifier enables a valid de-modification of the transferred data, and
wherein the evaluator is configured to initiate in this case the adaptation step.

28. The receiver of claim 15,
wherein the evaluator is configured to detect the case when more than one identifier enables a valid de-modification of the transferred data, and
wherein the evaluator is configured to discard in this case extracted data content provided by the de-modifier.

29. The receiver of claim 15,
wherein the evaluator is configured to discard extracted data content provided by the de-modifier in case the identifier enabling a valid de-modification is assigned to address information data referring to a different receiver.

30. A method for receiving at least one signal emitted by a transmitter, wherein the method comprises at least:
de-modifying transferred data comprised by the received signal using identifiers, and verifying whether a de-modification of the transferred data is valid,
extracting a short-address from the received signal,
storing data sets comprising identifiers and assigned address information data such that the data sets are associated with short-addresses, and
wherein at least a part of the transferred data is de-modified using only identifiers belonging to a data set associated with the extracted short-address.

31. A system, comprising:
a transmitter for emitting at least one signal towards a receiver, and
a receiver for receiving the at least one signal emitted by the transmitter,
wherein the transmitter comprises a hardware signal generator,
wherein the signal generator is configured to generate the signal to be emitted by the transmitter, wherein the signal generator is configured to generate the signal such that the signal comprises data content, and
wherein the signal generator is configured to generate the signal by modifying the data content using an identifier assigned to the transmitter or assigned to the receiver, wherein the signal generator is configured to generate the signal such that the signal carries at least one short-address based on an address assigned to the transmitter or based on an address assigned to the receiver, wherein the signal generator is configured to generate the short-address such that the short-address comprises less bits than the address and
wherein the receiver comprises a data storage, a de-modifier and an evaluator,
wherein the data storage is configured to store identifiers and address information data assigned to the identifiers, where the address information data refers to addresses assigned to transmitters or assigned to receivers, wherein the de-modifier is configured to de-modify at least a part of transferred data comprised by the received signal using identifiers provided by the data storage, and wherein the evaluator is configured to verify whether a de-modification is valid, wherein the receiver further comprises an extractor, wherein the extractor is configured to extract a short-address from the received signal, wherein the data storage is configured to store data sets comprising identifiers and assigned address information data such that the data sets are associated with short-addresses, and wherein the de-modifier is configured to de-modify at least a part of the transferred data using only identifiers belonging to a data set associated with the extracted short-address.

* * * * *